(12) United States Patent
Kang et al.

(10) Patent No.: US 7,466,501 B1
(45) Date of Patent: Dec. 16, 2008

(54) FIXED-FOCUS LENS

(75) Inventors: Yi-Hao Kang, Hsinchu (TW); Tao-Hung Kuo, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 12/015,370

(22) Filed: Jan. 16, 2008

(30) Foreign Application Priority Data

Jul. 27, 2007 (TW) .................................. 96127472

(51) Int. Cl.
*G02B 9/12* (2006.01)
*G02B 3/00* (2006.01)
(52) U.S. Cl. ..................... 359/784; 359/649; 359/651
(58) Field of Classification Search ................ 359/754, 359/761, 770, 781–784, 649–651
See application file for complete search history.

(56) References Cited

U.S. PATENT DOCUMENTS 6,822,804 B2 * 11/2004 Maruyama .................. 359/651

6,989,946 B2   1/2006 Kobayashi et al.

\* cited by examiner

*Primary Examiner*—William C Choi
*Assistant Examiner*—Jack Dinh
(74) *Attorney, Agent, or Firm*—J.C. Patents

(57) ABSTRACT

A fixed-focus lens including a first lens group, a second lens group, and a third lens group arranged from an object side to an image side in sequence is provided. The first lens group has a negative refractive power, and includes at least one aspheric lens. The second lens group has a positive refractive power, and includes a lens. The third lens group has a positive refractive power, and includes a triple cemented lens. An effective focal length (EFL) of the fixed-focus lens is f. An EFL of the first lens group is $f_1$. An EFL of the second lens group is $f_2$. An EFL of the third lens group is $f_3$. An axial distance between the first lens group and the second lens group is d. The fixed-focus lens satisfies: $2.5<|f_1/f|<4.5$, $7.5<f_2/f<10$, $4.5<f_3/f<8.5$, and $13<d/f<14$.

19 Claims, 9 Drawing Sheets

FIXED-FOCUS LENS

CROSS-REFERENCE TO RELATED APPLICATION

This application claims the priority benefit of Taiwan application serial no. 96127472, filed on Jul. 27, 2007. The entirety of the above-mentioned patent application is hereby incorporated by reference herein and made a part of this specification.

BACKGROUND OF THE INVENTION

1. Field of the Invention

The present invention relates to a lens. More particularly, the present invention relates to a fixed-focus lens.

2. Description of Related Art

Referring to FIG. 1, U.S. Pat. No. 6,989,946 has disclosed a conventional fixed-focus lens 100 applied to a rear projection television (RPTV), which includes a first lens group 110 and a second lens group 120 arranged from an object side to an image side in sequence. A liquid crystal light valve 50 is placed at the image side. The first lens group 110 includes two lenses 112 and 114 arranged from the object side to the liquid crystal light valve 50 in sequence. The second lens group 120 includes seven lenses 122a, 122b, 124, 126a, 126b, 126c, and 128 arranged from the object side to the liquid crystal light valve 50 in sequence. The lenses 122a and 122b form a cemented lens 122, and the lenses 126a, 126b, and 126c form another cemented lens 126.

Since a field of view (FOV) of the conventional fixed-focus lens 100 is not large enough (the maximum FOV is about 95°), a optical path length between the lens 112 and a screen (not shown) disposed at the object side must be long enough to project an image with an appropriate size onto the screen, which results in that the volume of the RPTV is excessively large. However, if the above optical path length is reduced by increasing the FOV through adjusting the refractive power of each lens of the fixed-focus lens 100, the image projected on the screen has a great aberration.

SUMMARY OF THE INVENTION

The present invention is directed to a fixed-focus lens having a large field of view (FOV) and capable of effectively reducing image aberration and chromatic aberration.

Other advantages of the present invention can be further understood from the technical features disclosed in the present invention.

In order to achieve one or a part of or all of the above advantages or other advantages, an embodiment of the present invention provides a fixed-focus lens including a first lens group, a second lens group, and a third lens group. The first lens group is located between an object side and an image side, and has a negative refractive power. The first lens group includes at least one aspheric lens. The second lens group is disposed between the first lens group and the image side, and has a positive refractive power. The second lens group includes a lens. The third lens group is disposed between the second lens group and the image side, and has a positive refractive power. The third lens group includes a triple cemented lens. An effective focal length (EFL) of the fixed-focus lens is f. An EFL of the first lens group is $f_1$. An EFL of the second lens group is $f_2$. An EFL of the third lens group is $f_3$. An axial distance between the first lens group and the second lens group is d. The fixed-focus lens satisfies: $2.5 < |f_1/f| < 4.5$, $7.5 < f_2/f < 10$, $4.5 < f_3/f < 8.5$, and $13 < d/f < 14$.

In the fixed-focus lens, lenses constituting the first lens group are mainly used to receive light beams with wide viewing angle, so that the fixed-focus lens has a large FOV. Moreover, the aspheric lens in the first lens group is used to reduce the distortion and image aberration of optical imaging. The triple cemented lens of the third lens group is capable of further reducing the image aberration and chromatic aberration of optical imaging. Therefore, the fixed-focus lens has a large FOV, a small image aberration and a chromatic aberration of imaging, a low distortion degree, and so on.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
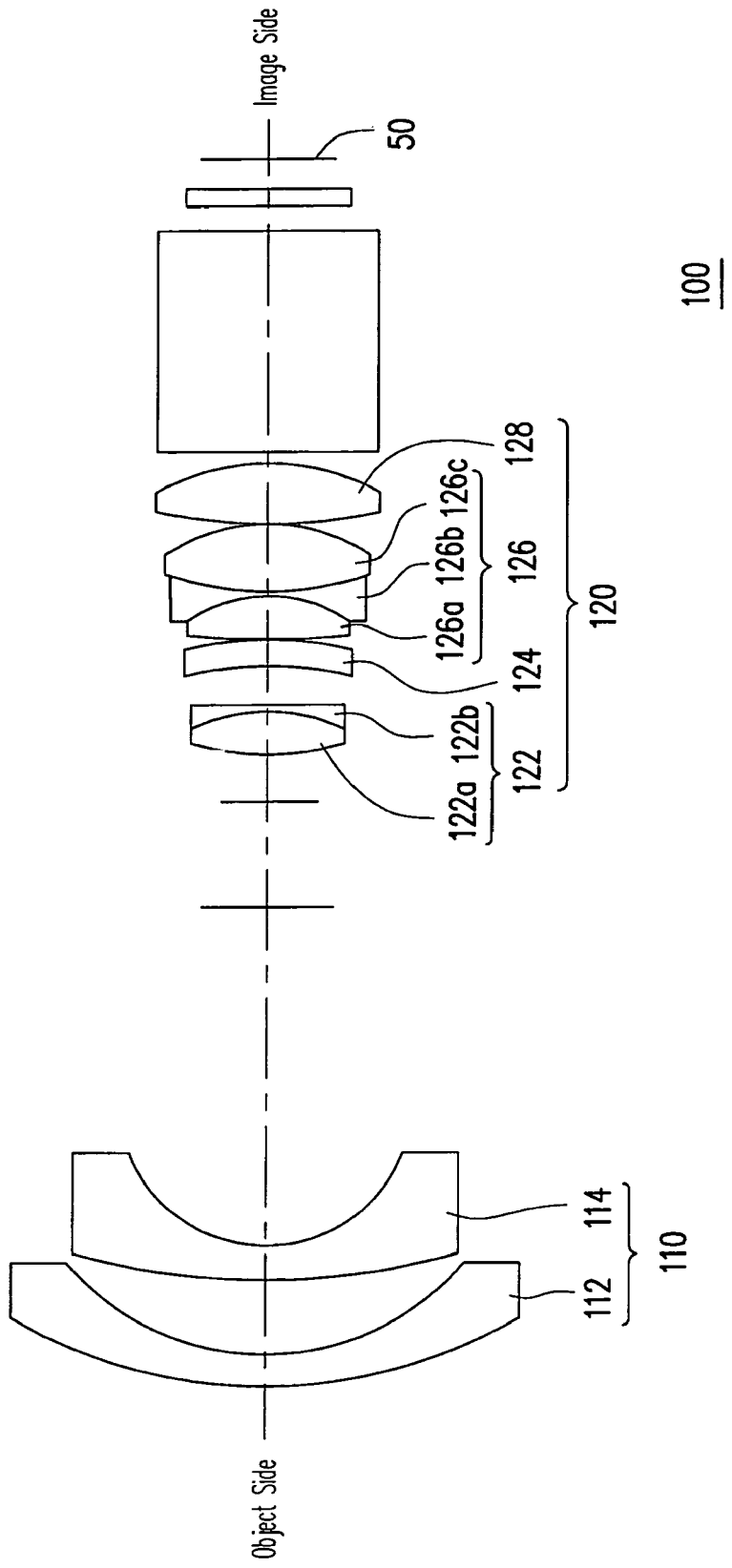
FIG. 1 is a schematic structural view of a conventional fixed-focus lens applied to a rear projection television (RPTV).
Figure 2:
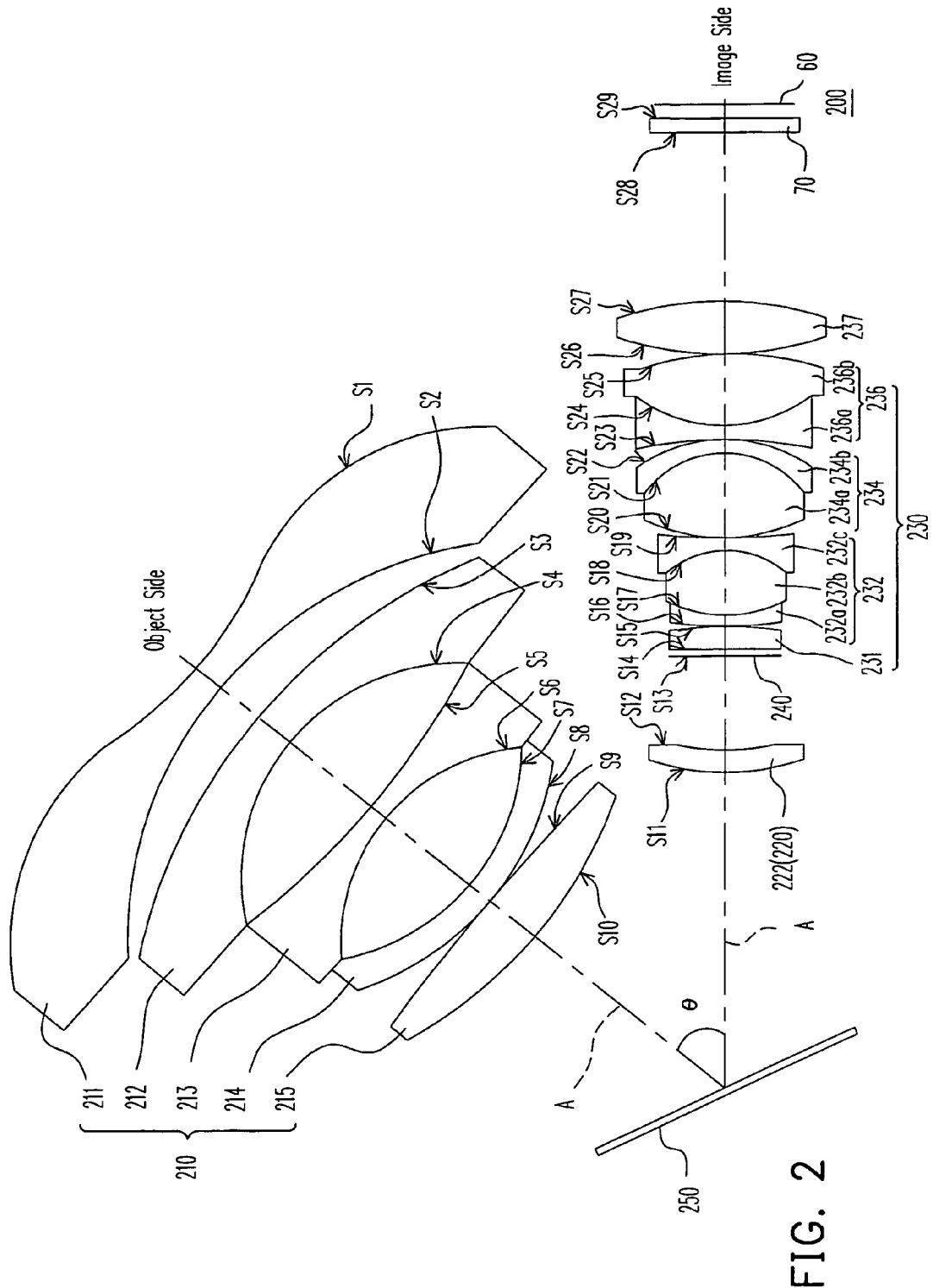
FIG. 2 is a schematic structural view of a fixed-focus lens according to an embodiment of the present invention.

Referring to FIG. 2, a fixed-focus lens 200 according to an embodiment of the present invention includes a first lens group 210, a second lens group 220, and a third lens group 230. The first lens group 210 is located between an object side and an image side, and has a negative refractive power. The first lens group 210 includes at least one aspheric lens. In this embodiment, the first lens group 210 includes a first lens 211 and a second lens 212 arranged from the object side to the image side in sequence, and the first lens 211 and the second lens 212 are both aspheric lenses. In detail, in this embodiment, the first lens group 210 consists of the first lens 211, the second lens 212, a third lens 213, a fourth lens 214, and a fifth lens 215 arranged from the object side to the image side in sequence. Refractive powers of the first, second, third, fourth, and fifth lenses 211 to 215 are, for example, negative, positive, negative, negative, and positive, respectively. The third lens 213 is, for example, a biconcave lens, the fourth lens 214 is, for example, a convex-concave lens having a convex surface facing the image side, and the fifth lens 215 is, for example, a biconvex lens.

The second lens group 220 is disposed between the first lens group 210 and the image side, and has a positive refractive power. The second lens group 220 includes a lens. In this embodiment, the second lens group 220 consists of a sixth lens 222 having a positive refractive power. The sixth lens 222 is, for example, a concave-convex lens having a convex surface facing the object side.

The third lens group 230 is disposed between the second lens group 220 and the image side, and has a positive refractive power. The third lens group 230 includes a triple cemented lens 232. In this embodiment, the triple cemented lens 232 has a negative refractive power, and consists of a seventh lens 232a, an eighth lens 232b, and a ninth lens 232c, in which the refractive powers of the seventh, eighth, and ninth lenses 232a, 232b, and 232c are negative, positive, and negative, respectively. Moreover, the third lens group 230 may further include a first double cemented lens 234 and a second double cemented lens 236. The first double cemented lens 234 is disposed between the triple cemented lens 232 and the image side, and has a positive refractive power. The first double cemented lens 234 may consist of a tenth lens 234a and an eleventh lens 234b. The tenth lens 234a has a positive refractive power, and the eleventh lens 234b has a negative refractive power. The second double cemented lens 236 is disposed between the first double cemented lens 234 and the image side, and has a negative refractive power. The second double cemented lens 236 may consist of a twelfth lens 236a and a thirteenth lens 236b. The twelfth lens 236a has a negative refractive power, and the thirteenth lens 236b has a positive refractive power.

In detail, in this embodiment, the third lens group 230 consists of a fourteenth lens 231, the seventh lens 232a, the eighth lens 232b, the ninth lens 232c, the tenth lens 234a, the eleventh lens 234b, the twelfth lens 236a, the thirteenth lens 236b, and a fifteenth lens 237. The fourteenth lens 231 may have a positive refractive power, and the fifteenth lens 237 may also have a positive refractive power. The seventh, eighth, ninth, tenth, eleventh, twelfth, thirteenth, fourteenth, and fifteenth lenses 232a, 232b, 232c, 234a, 234b, 236a, 236b, 231, and 237 are, for example, a convex-concave lens having a convex surface facing the object side, a biconvex lens, a biconcave lens, a biconvex lens, a convex-concave lens having a convex surface facing the image side, a biconcave lens, a biconvex lens, a concave-convex lens having a convex surface facing the image side, and a biconvex lens, respectively.

Moreover, the fixed-focus lens 200 satisfies all of the following four conditions:

$$2.5 < |f_1/f| < 4.5; \qquad \text{(i)}$$

$$7.5 < f_2/f < 10; \qquad \text{(ii)}$$

$$4.5 < f_3/f < 8.5; \qquad \text{(iii)}$$

$$13 < d/f < 14; \qquad \text{(iv)}$$

where f is the effective focal length (EFL) of the fixed-focus lens 200, $f_1$ is the EFL of the first lens group 210, $f_2$ is the EFL of the second lens group 220, $f_3$ is the EFL of the third lens group 230, d is the axial distance between the first lens group 210 and the second lens group 220, in which the axial distance refers to a distance along an optical axis A of the fixed-focus lens 200.

Generally speaking, an image processing device 60 may be disposed at the image side, and the image processing device 60 in this embodiment is, for example, a light valve. Moreover, in this embodiment, the fixed-focus lens 200 is adapted to form the image provided by the image processing device 60 onto the object side. Furthermore, the fixed-focus lens 200 may further include an aperture stop 240 disposed between the second lens group 220 and the third lens group 230. Additionally, the fixed-focus lens 200 may further include a reflector 250 disposed between the first lens group 210 and the second lens group 220 for reflecting the light beams from the second lens group 220 to the first lens group 210. In other words, the fixed-focus lens 200 may be an L-shaped lens.

d (i.e. the axial distance between the first lens group 210 and the second lens group 220) may have multiple setting values. In detail, when the projection distance changes, the position of imaging plane may be changed through adjusting the axial distance d between the first lens group 210 and the second lens group 220. For example, d may be one of different distance values, and may be switched among those distance values by means of a mechanism, such that the fixed-focus lens 200 may project images of different sizes. In this embodiment, d may have two setting values, so that the fixed-focus lens 200 projects images of two sizes. However, in other embodiments, d may have only one setting value.

In order to ensure the optical imaging quality, the fixed-focus lens 200 in this embodiment may satisfy at least one of the following eight conditions:

$$0.8 < |f_{L1}/f_1| < 2.5; \qquad \text{(v)}$$

$$-35 < f_{L2}/f_1 < -28; \qquad \text{(vi)}$$

$$n_{max} - n_{min} > 0.25; \qquad \text{(vii)}$$

$$v_{max} - v_{min} > 35; \qquad \text{(viii)}$$

$$|n_{L10} - n_{L11}| > 0.25; \qquad \text{(ix)}$$

$$|v_{L10} - v_{L11}| > 35; \qquad \text{(x)}$$

$$|n_{L12} - n_{L13}| > 0.25; \qquad \text{(xi)}$$

$$|v_{L12} - v_{L13}| > 35; \qquad \text{(xii)}$$

where $f_{L1}$ is the EFL of the first lens 211, $f_{L2}$ is the EFL of the second lens 212, $n_{max}$ is the maximum of the refractive indexes of the seventh, eighth, and ninth lenses 232a, 232b, and 232c, $n_{min}$ is the minimum of the refractive indexes of the seventh, eighth, and ninth lenses 232a, 232b, and 232c, $v_{max}$ is the maximum of the Abbe numbers (dispersion coefficient) of the seventh, eighth, and ninth lenses 232a, 232b, and 232c, $v_{min}$ is the minimum of the Abbe numbers of the seventh, eighth, and ninth lenses 232a, 232b, and 232c, $n_{L10}$ and $v_{L10}$ are respectively a refractive index and an Abbe number of the tenth lens 234a, $n_{L11}$ and $v_{L11}$ are respectively a refractive index and an Abbe number of the eleventh lens 234b, $n_{L12}$ and $v_{L12}$ are respectively a refractive index and an Abbe number of the twelfth lens 236a, and $n_{L13}$ and $V_{L13}$ are respectively a refractive index and an Abbe number of the thirteenth lens 236b.

In the fixed-focus lens 200 of this embodiment, the first lens 211 and the second lens 212 are mainly used to receive light with wide viewing angle, so that the fixed-focus lens 200 has a large field of view (FOV). In this embodiment, the maximum FOV of the fixed-focus lens 200 reaches about 115°. As such, when the fixed-focus lens 200 is applied in a rear projection television (RPTV), the optical path length between the fixed-focus lens 200 and a screen located at the object side may be shortened effectively, such that the RPTV has smaller volume and thickness. Moreover, the aspheric lenses (i.e. the first lens 211 and the second lens 212) in the first lens group 210 are used to reduce distortion and image aberration of optical imaging. Furthermore, the triple cemented lens 232, the first double cemented lens 234, and the second double cemented lens 236 in the third lens group 230 may be composed of lenses having high and low Abbe numbers, so as to further reduce image aberration and chromatic aberration of optical imaging. Therefore, the fixed-focus lens 200 has the advantages of a large FOV, small image aberration and chromatic aberration of imaging, a low distortion degree, and so on.

The fixed-focus lens 200 of this embodiment can also effectively reduce "ghost images" of imaging. The "ghost image" refers to an undesired image on the screen formed by a part of the light beams being emitted from the image processing device 60, striking the lenses of the fixed-focus lens 200, being reflected by the lenses, being reflected by the image processing device 60, passing through the fixed-focus lens 200, and striking the screen in sequence. Moreover, a bent angle θ of the optical axis A of the fixed-focus lens 200 at the reflector 250 may be smaller (to 50.5°), so as to further reduce the thickness of the RPTV.

An embodiment of the fixed-focus lens 200 is given hereinafter. It should be noted that the data listed in Tables 1 and 2 is not intended to limit the present invention, and persons of ordinary skills in the art can make some appropriate alternations on the parameters or settings with reference to the disclosure of the present invention without departing from the scope of the present invention.

TABLE 1

| Surface | Radius of Curvature (mm) | Interval (mm) | Refractive Index | Abbe Number | Remarks |
|---|---|---|---|---|---|
| S1 | −44.5707 | 5.0000 | 1.49 | 57.4 | The First Lens |
| S2 | 31.3658 | 7.3413 | | | |
| S3 | 57.2195 | 5.0000 | 1.49 | 57.4 | The Second Lens |
| S4 | 67.5813 | 14.3955 | | | |
| S5 | −124.7160 | 3.0000 | 1.59 | 61.3 | The Third |

TABLE 1-continued

| Surface | Radius of Curvature (mm) | Interval (mm) | Refractive Index | Abbe Number | Remarks |
|---|---|---|---|---|---|
| | | | | | Lens |
| S6 | 28.9753 | 14.7792 | | | |
| S7 | −31.7860 | 3.9095 | 1.7 | 55.5 | The Fourth Lens |
| S8 | −42.8078 | 0.2000 | | | |
| S9 | 433.1714 | 7.2839 | 1.73 | 28.5 | The Fifth Lens |
| S10 | −66.5743 | 79.5200 | | | |
| S11 | 34.2322 | 3.4728 | 1.85 | 23.8 | The Sixth Lens |
| S12 | 142.8329 | 13.0682 | | | |
| S13 | Infinity | 1.2775 | | | The Aperture Stop |
| S14 | −322.9126 | 3.0042 | 1.57 | 56.4 | The Fourteenth Lens |
| S15 | −79.0336 | 0.2000 | | | |
| S16 | 74.5220 | 1.2000 | 1.8 | 46.6 | The Seventh Lens |
| S17 | 14.227207 | 9.2353 | 1.52 | 64.2 | The Eighth Lens |
| S18 | −14.227206 | 2.0000 | 1.81 | 25.4 | The Ninth Lens |
| S19 | 129.280835 | 0.2000 | | | |
| S20 | 26.103933 | 11.2968 | 1.5 | 81.6 | The Tenth Lens |
| S21 | −14.820449 | 2.0000 | 1.83 | 42.7 | The Eleventh Lens |
| S22 | −21.036314 | 0.2000 | | | |
| S23 | −71.765942 | 2.0000 | 1.83 | 42.7 | The Twelfth Lens |
| S24 | 20.861134 | 9.6090 | 1.5 | 81.6 | The Thirteenth Lens |
| S25 | −63.689487 | 0.6836 | | | |
| S26 | 47.619432 | 7.1325 | 1.81 | 25.4 | The Fifteenth Lens |
| S27 | −67.432502 | 26.2908 | | | |
| S28 | Infinity | 1.0500 | 1.51 | 63.1 | Cover Glass |
| S29 | Infinity | 1.1000 | | | |

In Table 1, the interval refers to a straight distance along the optical axis A between two neighboring surfaces. For example, the interval of surface S1 is the straight distance along the optical axis A between surface S1 and surface S2. The corresponding thickness, refractive index, and Abbe number of each lens in the Remarks column refers to the values, in the same row, corresponding to the interval, refractive index, and Abbe number. Moreover, in Table 1, surfaces S1 and S2 are two surfaces of the first lens 211. Surfaces S3 and S4 are two surfaces of the second lens 212. Surfaces S5 and S6 are two surfaces of the third lens 213. Surfaces S7 and S8 are two surfaces of the fourth lens 214. Surfaces S9 and S10 are two surfaces of the fifth lens 215. Surfaces S11 and S12 are two surfaces of the sixth lens 222. Surface S13 is the aperture stop 240. Surfaces S14 and S15 are two surfaces of the fourteenth lens 231. Surface S16 is a surface of the seventh lens 232a facing the object side. Surface S17 is a surface connecting the seventh lens 232b and the eighth lens 232b. Surface S18 is a surface connecting the eighth lens 232b and the ninth lens 232c. Surface S19 is a surface of the ninth lens 232c facing the image side. Surface S20 is a surface of the tenth lens 234a facing the object side. Surface S21 is a surface connecting the tenth lens 234a and the eleventh lens 234b. Surface S22 is a surface of the eleventh lens 234b facing the image side. Surface S23 is a surface of the twelfth lens 236a facing the object side. Surface S24 is a surface connecting the twelfth lens 236a and the thirteenth lens 236b. Surface S25 is a surface of the thirteenth lens 236b facing the image side. Surfaces S26 and S27 are two surfaces of the fifteenth lens 237. Surfaces S28 and S29 are two surfaces of a cover glass 70 that provides protection for the image processing device 60. The interval filled in the row of the surface S29 refers to the interval from the surface S29 to the image processing device 60.

The parameters such as the radius of curvature and the interval of each surface are given in Table 1 for reference, and will not be repeated herein.

The above surfaces S1, S2, S3, and S4 are odd power term aspheric, and may be expressed by the following formula:

$$Z = \frac{cr^2}{1+\sqrt{1-(1+k)c^2r^2}} + A_2 r^2 + A_4 r^4 + A_6 r^6 + A_8 r^8 + A_{10} r^{10} + A_{12} r^{12} + A_{14} r^{14} + \ldots$$

In the formula, Z is a sag along the optical axis A, and c is the reciprocal of the radius of the osculating sphere, i.e. the reciprocal of the radius of curvature (e.g., the radius of curvatures of S1, S2, S3, and S4 in Table 1) close to the optical axis A. k is a conic coefficient. r is an aspheric height, i.e., the height from the center to the edge of the lens. $A_2, A_4, A_6, A_8, A_{10}, A_{12}, A_{14}\ldots$ are aspheric coefficients, and $A_2$ is 0 in this embodiment. The parameters of the surface S1, S2, S3, and S4 are listed in Table 2.

TABLE 2

| Aspheric Parameter | Conic Co-efficient k | Coefficient $A_4$ | Coefficient $A_6$ | Coefficient $A_8$ |
|---|---|---|---|---|
| S1 | −13.8381 | 6.39762E−06 | −2.75128E−09 | 7.78082E−13 |
| S2 | −0.73295 | −2.76306E−05 | 5.22676E−08 | −4.86789E−11 |
| S3 | 0.1983 | −1.33525E−05 | 1.63135E−08 | −9.34728E−12 |
| S4 | 0.959951 | 2.79391E−05 | −3.22396E−08 | −5.58667E−12 |

| Aspheric Parameter | Coefficient $A_{10}$ | Coefficient $A_{12}$ | Coefficient $A_{14}$ |
|---|---|---|---|
| S1 | −4.06746E−17 | −4.11126E−20 | 9.20639E−24 |
| S2 | 1.95750E−14 | −1.71759E−18 | −5.19990E−22 |
| S3 | 1.85417E−15 | 2.43491E−19 | |
| S4 | 6.78597E−14 | −2.82576E−17 | |

Figure 3A:
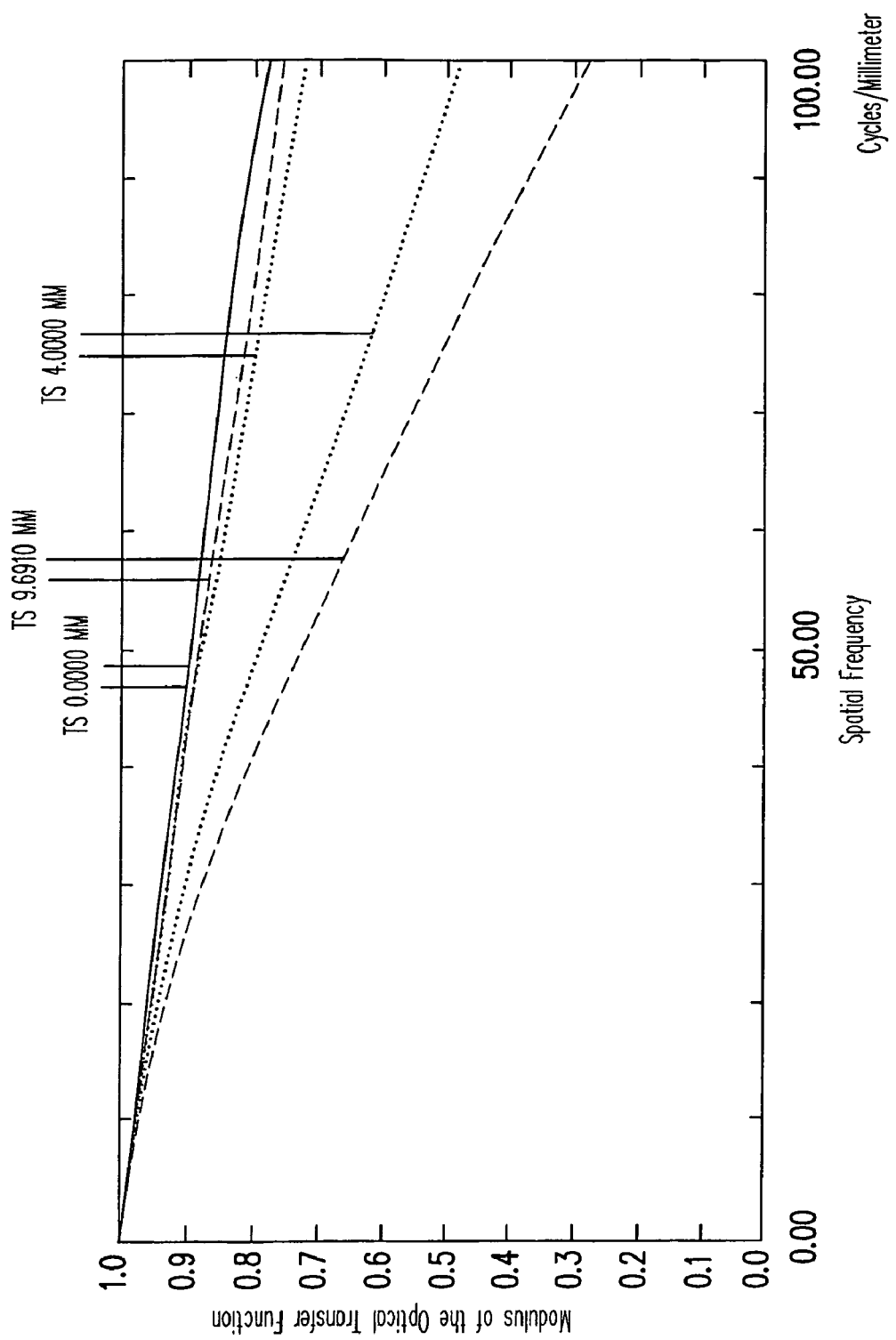
FIGS. 3A to 3C are diagrams showing optical simulation data of imaging of the fixed-focus lens in FIG. 2.
Figure 3B:
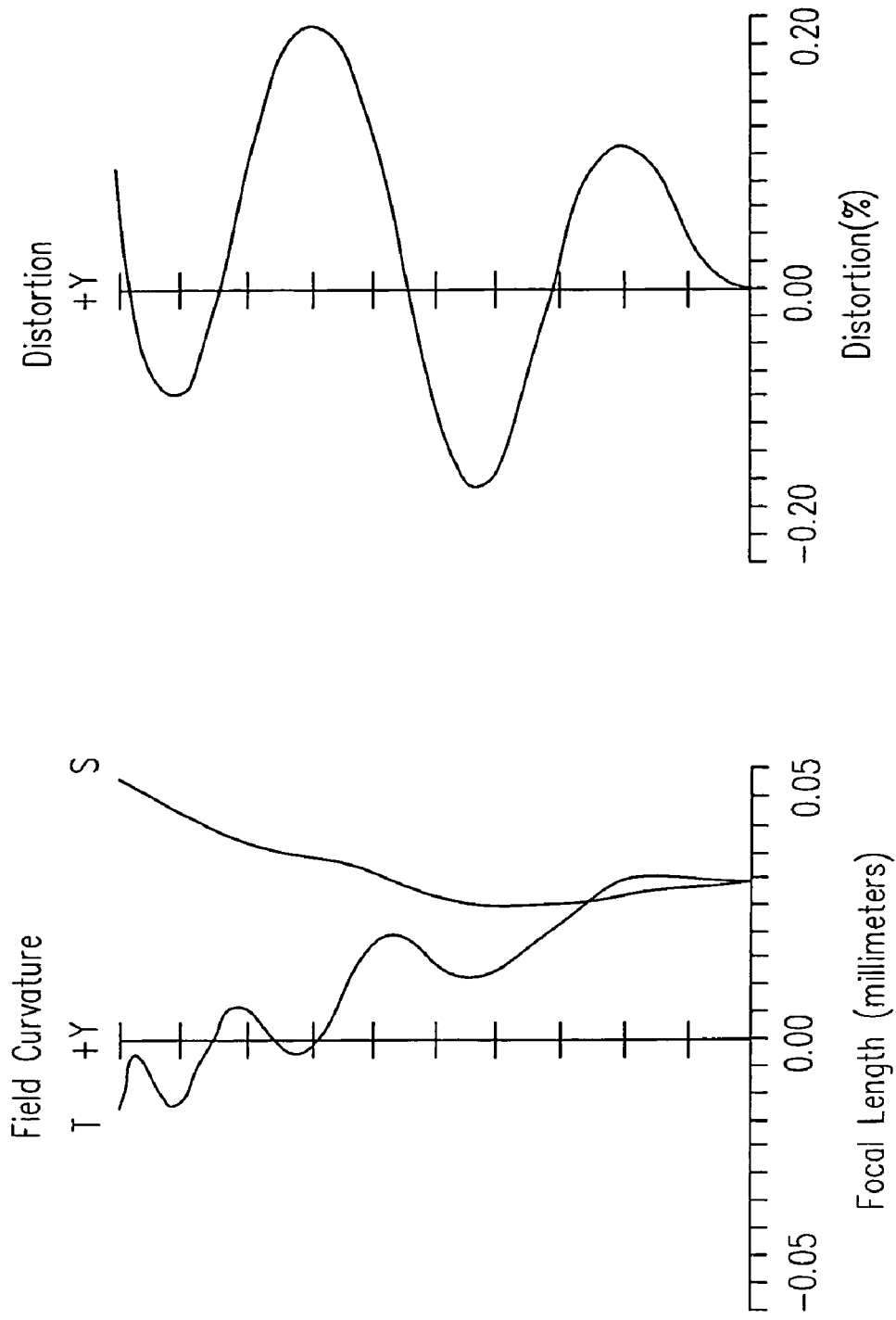
Figure 3C:
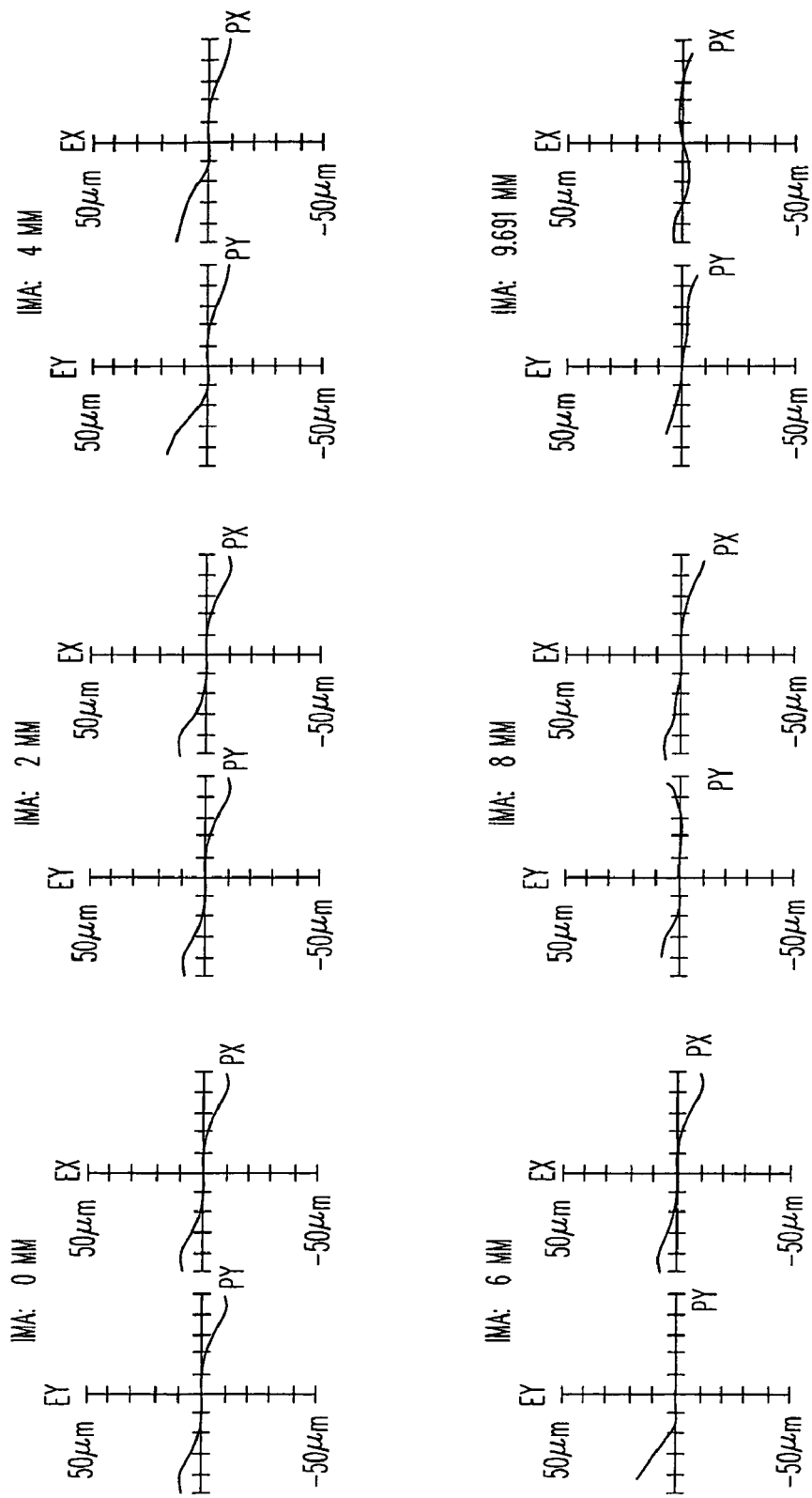

FIGS. 3A to 3C are diagrams showing optical simulation data of the imaging of the fixed-focus lens in FIG. 2. Referring to FIGS. 3A to 3C, FIG. 3A is a diagram of a modulation transfer function (MTF), in which the transverse axis is a spatial frequency in cycles per millimeter, and the longitudinal axis is a modulus of the optical transfer function (OTF). FIG. 3A is a simulation data diagram obtained with a light having a wavelength of 550 nm. Moreover, FIG. 3B shows graphics of a field curvature and a distortion respectively from left to right. FIG. 3C is a transverse ray fan plot of the image. Since all the graphics shown in FIGS. 3A to 3C fall within a standard range, the fixed-focus lens 200 of this embodiment can maintain a good imaging quality while having a larger FOV.

Figure 4:
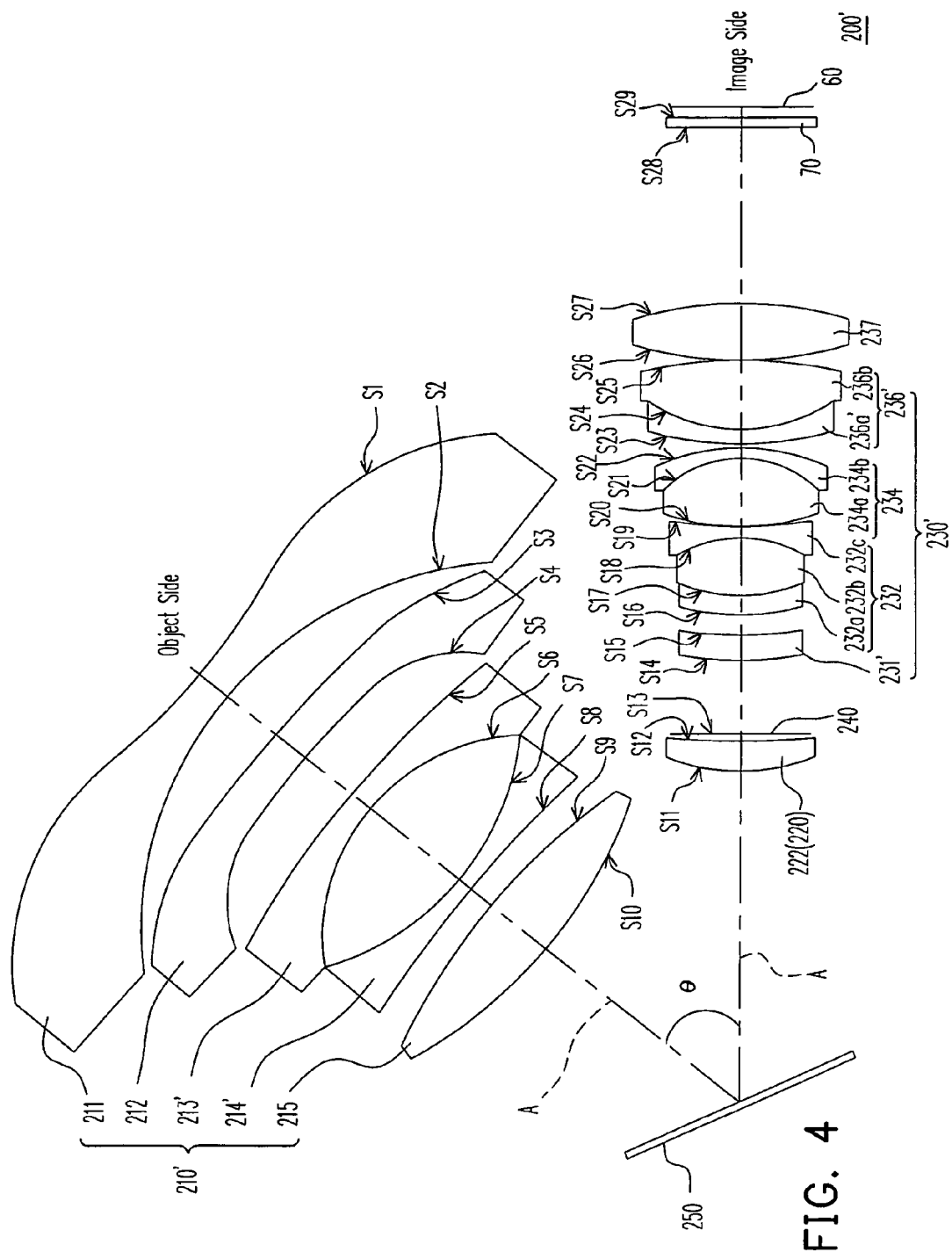
FIG. 4 is a schematic structural view of a fixed-focus lens according to another embodiment of the present invention.

Referring to FIG. 4, a fixed-focus lens 200' according to another embodiment of the present invention is similar to the above fixed-focus lens 200 (referring to FIG. 2), and the differences therebetween are described as follows. In the fixed-focus lens 200' of this embodiment, a third lens 213' of a first lens group 210' is a convex-concave lens having a convex surface facing the object side, and a fourth lens 214' of the first lens group 210' is a biconcave lens. Moreover, in this embodiment, a twelfth lens 236a' in a second double cemented lens 236' of a third lens group 230' is a convex-concave lens having a convex surface facing the object side.

Furthermore, a fourteenth lens 231' of the third lens group 230' may have a negative refractive power, and be an aspheric lens. The fourteenth lens 231' is, for example, a convex-concave lens having a convex surface facing the object side. In addition to having the above advantages of the fixed-focus lens 200, since the fourteenth lens 231' of the fixed-focus lens 200' adopts the aspheric lens, when each lens of the fixed-focus lens 200' expands under heating or contracts under cooling, the fourteenth lens 231' may be used to reduce the extent of deterioration of imaging at corners of the screen.

An embodiment of the fixed-focus lens 200' is given hereinafter, but the present invention is not limited to this. Please refer to FIG. 4 and Tables 3.

TABLE 3

| Surface | Radius of Curvature (mm) | Interval (mm) | Refractive Index | Abbe Number | Remarks |
|---|---|---|---|---|---|
| S1 | −65.2618 | 5.0000 | 1.49 | 57.4 | The First Lens |
| S2 | 29.6574 | 8.7904 | | | |
| S3 | 745.4079 | 5.0000 | 1.49 | 57.4 | The Second Lens |
| S4 | −229.5254 | 8.2048 | | | |
| S5 | 160.6157 | 3.0000 | 1.83 | 37.2 | The Third Lens |
| S6 | 24.7209 | 15.3739 | | | |
| S7 | −36.9598 | 3.0000 | 1.62 | 60.3 | The Fourth Lens |
| S8 | 277.5249 | 3.9725 | | | |
| S9 | 133.1010 | 8.6584 | 1.74 | 49.4 | The Fifth Lens |
| S10 | −62.9038 | 80.9756 | | | |
| S11 | 28.9689 | 4.0000 | 1.73 | 28.5 | The Sixth Lens |
| S12 | 101.8383 | 1.0015 | | | |
| S13 | Infinity | 10.5000 | | | The Aperture Stop |
| S14 | 89.5050 | 3.1000 | 1.53 | 56 | The Fourteenth Lens |
| S15 | 48.8754 | 3.3155 | | | |
| S16 | 37.8590 | 2.4019 | 1.83 | 42.7 | The Seventh Lens |
| S17 | 17.881813 | 7.9966 | 1.5 | 81.6 | The Eighth Lens |
| S18 | −16.520084 | 1.6000 | 1.83 | 42.7 | The Ninth Lens |
| S19 | 49.692488 | 0.2000 | | | |
| S20 | 29.479303 | 9.2186 | 1.5 | 81.6 | The Tenth Lens |
| S21 | −15.596432 | 1.6000 | 1.83 | 42.7 | The Eleventh Lens |
| S22 | −26.136182 | 0.9927 | | | |
| S23 | 77.272679 | 1.6000 | 1.83 | 42.7 | The Twelfth Lens |
| S24 | 22.175587 | 8.9810 | 1.5 | 81.6 | The Thirteenth Lens |
| S25 | −65.383445 | 0.2000 | | | |
| S26 | 39.636394 | 7.7323 | 1.49 | 70.2 | The Fifteenth Lens |
| S27 | −51.19072 | 26.3842 | | | |
| S28 | Infinity | 1.0500 | 1.51 | 63.1 | Cover Glass |
| S29 | Infinity | 1.1000 | | | |

In Table 3, the surfaces S1-S4, S9-S13, S16-S22, and S25-S29 are the same as those in Table 1. The surfaces S5 and S6 are two surfaces of the third lens 213'. The surfaces S7 and S8 are two surfaces of the fourth lens 214'. The surfaces S14 and S15 are two surfaces of the fourteenth lens 231'. The surface S23 is a surface of the twelfth lens 236a' facing the object side. The surface S24 is a surface connecting the twelfth lens 236a' and thirteenth lens 236b.

The above surfaces S1, S2, S3, and S4 are odd power term aspheric, and may be expressed by the following formula:

$$Z = \frac{cr^2}{1+\sqrt{1-(1+k)c^2r^2}} + A_1r^1 + A_2r^2 + A_3r^3 + A_4r^4 + A_5r^5 +$$
$$A_6r^6 + A_7r^7 + A_8r^8 + A_9r^9 + A_{10}r^{10} + A_{11}r^{11} + A_{12}r^{12} + \ldots$$

The coefficients $A_1$ and $A_2$ in this embodiment are both 0.

The above surface S14 and S15 are even power term aspheric, and may be expressed by the following formula:

$$Z = \frac{cr^2}{1+\sqrt{1-(1+k)c^2r^2}} + A_2r^2 + A_4r^4 + A_6r^6 + A_8r^8 + \ldots$$

The coefficient $A_2$ in this embodiment is 0.

The parameters of the surfaces S1, S2, S3, S4, S14, and S15 are listed in Table 4.

TABLE 4

| Aspheric Parameter | Conic Coefficient k | Coefficient $A_3$ | Coefficient $A_4$ | Coefficient $A_5$ |
|---|---|---|---|---|
| S1 | −1.0000 | −2.49873E−05 | 1.73214E−05 | −1.04562E−07 |
| S2 | −1.77066 | 1.64543E−04 | −3.02560E−05 | 1.44744E−07 |
| S3 | 68.0308 | 7.11054E−05 | −3.61223E−06 | −5.41818E−08 |
| S4 | −1 | −1.46529E−04 | 5.13432E−05 | −3.83077E−07 |

| Aspheric Parameter | Coefficient $A_6$ | Coefficient $A_7$ | Coefficient $A_8$ | Coefficient $A_9$ |
|---|---|---|---|---|
| S1 | −3.67467E−08 | 2.40061E−09 | −8.19501E−11 | 1.68030E−12 |
| S2 | 3.58884E−08 | 1.43962E−09 | −1.35644E−10 | 3.50751E−12 |
| S3 | 1.51511E−08 | 6.54628E−12 | −1.02029E−11 | 1.10537E−14 |
| S4 | −1.53647E−07 | 1.32800E−08 | −6.47650E−10 | 1.90096E−11 |

| Aspheric Parameter | Coefficient $A_{10}$ | Coefficient $A_{11}$ | Coefficient $A_{12}$ |
|---|---|---|---|
| S1 | −2.02676E−14 | 1.27796E−16 | −2.91224E−19 |
| S2 | −6.99267E−14 | 1.41782E−15 | −1.34186E−17 |
| S3 | 1.83718E−15 | −9.31306E−19 | 1.39157E−19 |
| S4 | −2.30905E−13 | 0.00000E+00 | 0.00000E+00 |

| Aspheric Parameter | Conic Coefficient k | Coefficient $A_4$ | Coefficient $A_6$ | Coefficient $A_8$ |
|---|---|---|---|---|
| S14 | 0.0000 | −2.73033E−05 | 6.00516E−08 | −1.97810E−10 |
| S15 | 0.0000 | −2.99199E−05 | 6.97797E−08 | −3.94212E−10 |

Figure 5A:
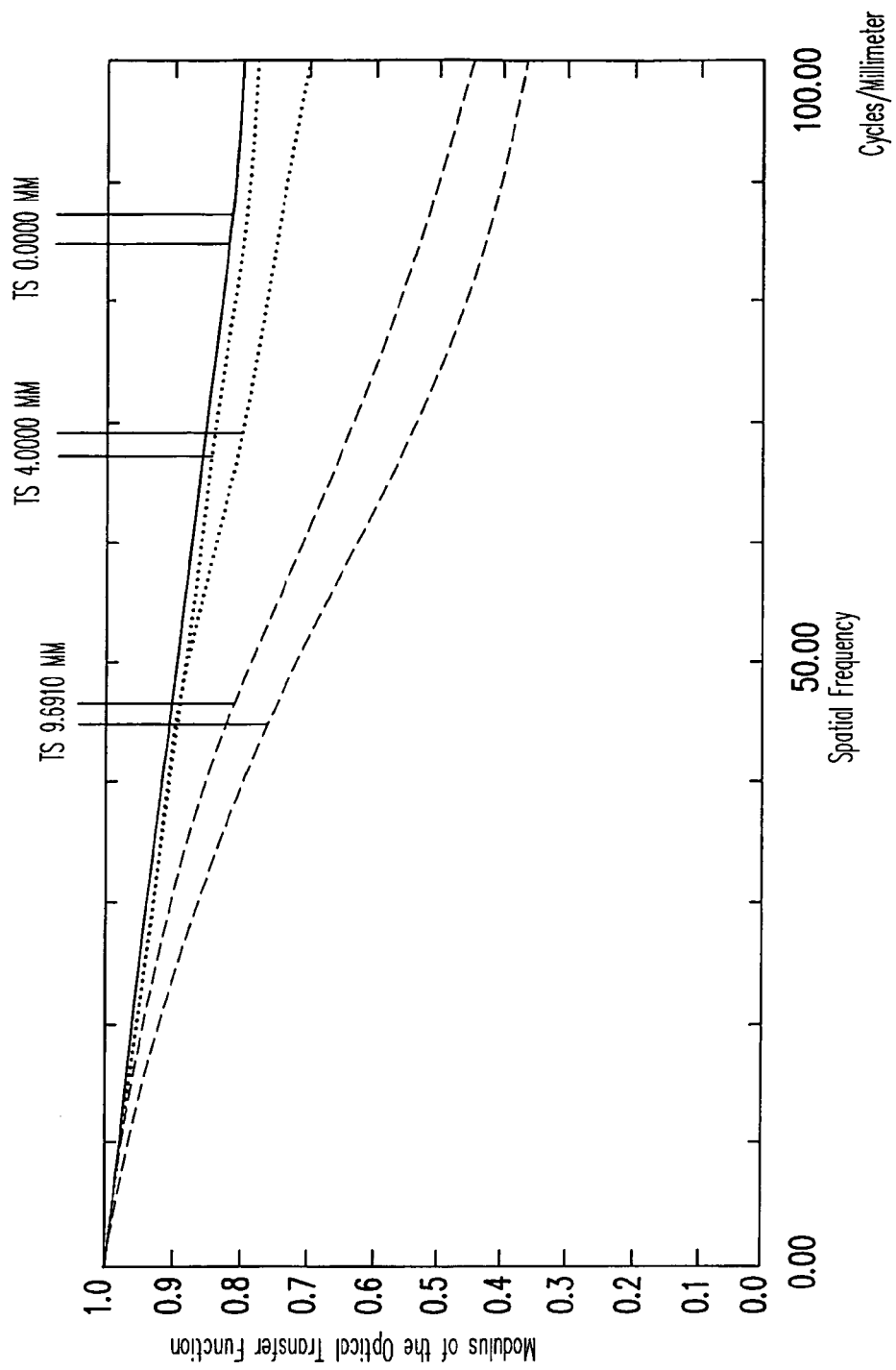
FIGS. 5A to 5C are diagrams showing optical simulation data of imaging of the fixed-focus lens in FIG. 4.
Figure 5B:
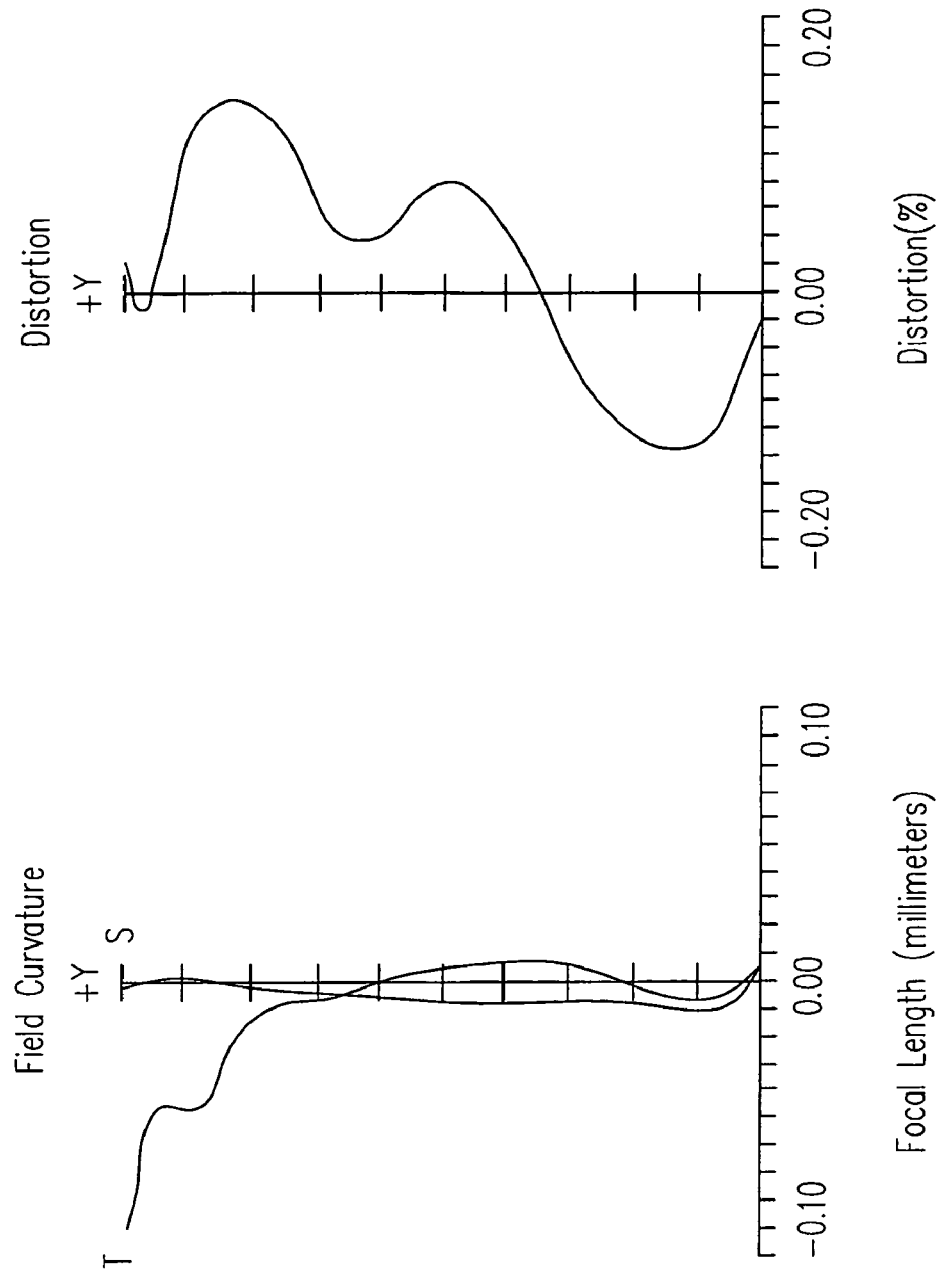
Figure 5C:
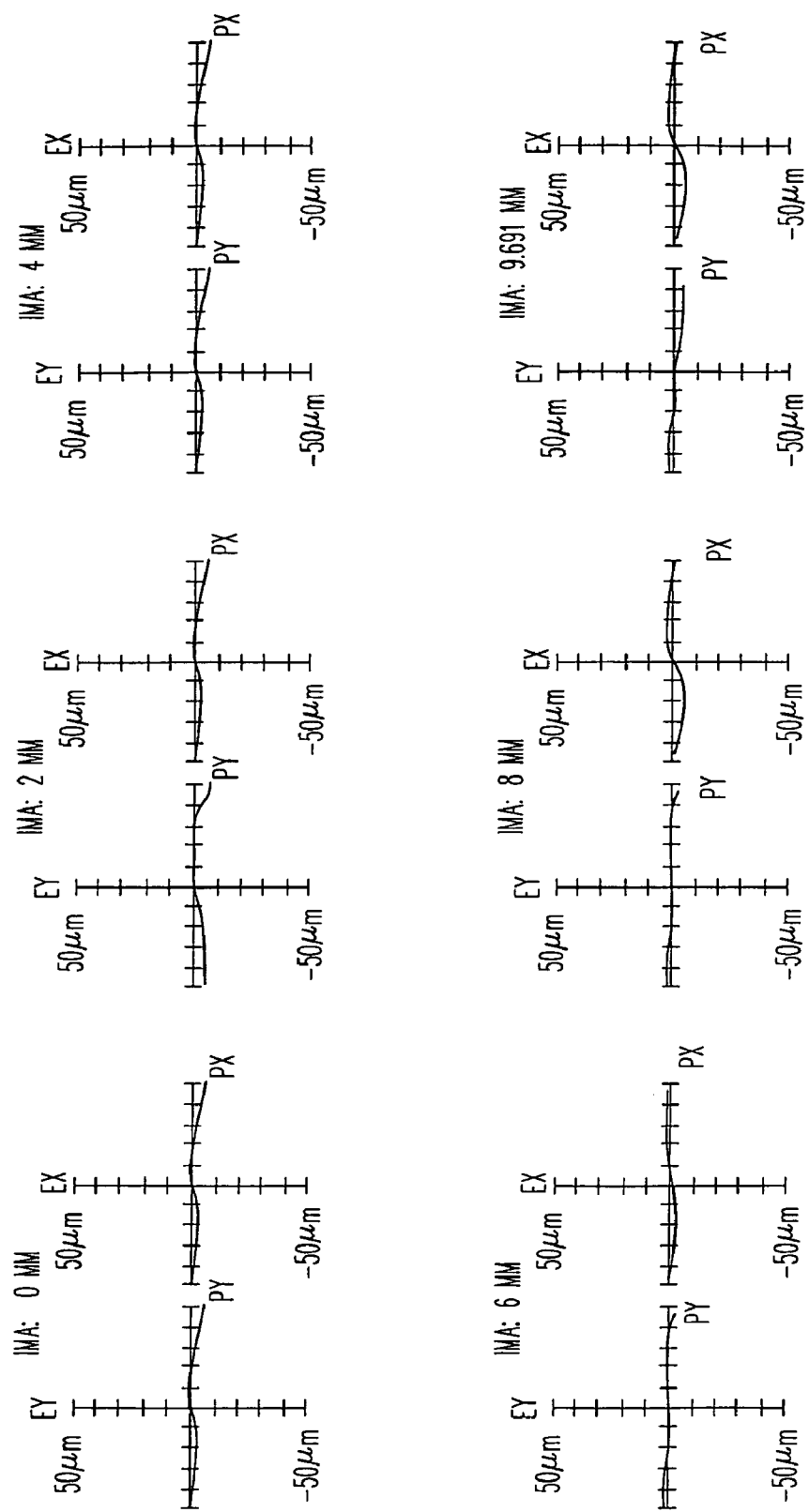

FIGS. 5A to 5C are diagrams showing optical simulation data of the imaging of the fixed-focus lens in FIG. 4. Referring to FIGS. 5A to 5C, FIG. 5A is a diagram of a modulation transfer function (MTF), in which the transverse axis is a spatial frequency in cycles per millimeter, and the longitudinal axis is a modulus of the OTF. FIG. 5A is a simulation data diagram obtained with a light having a wavelength of 550 nm. Moreover, FIG. 5B shows graphics of a field curvature and a distortion respectively from left to right. FIG. 5C is a transverse ray fan plot of image. Since all the graphics shown in FIGS. 5A to 5C fall within a standard range, the fixed-focus lens 200' can maintain a good imaging quality while having a larger FOV.

It should be noted that the fixed-focus lens of the present invention is not limited to have the reflector 250 shown in FIG. 2 or FIG. 4 to become an L-shaped lens. In other embodiments, the fixed-focus lens may not have the reflector, and the first to third lens groups are arranged in a straight line, so that the fixed-focus lens becomes a straight lens.

In view of the above, in the fixed-focus lens, the first lens and the second lens are mainly used to receive light with wide viewing angle, so that the fixed-focus lens has a large FOV. As such, when the fixed-focus lens is, for example, applied in an RPTV, the optical path length between the fixed-focus lens and the screen located at the object side is shortened effectively, so that the RPTV has smaller volume and thickness. Moreover, the aspheric lenses in the first lens group are used to reduce distortion and image aberration of optical imaging. Furthermore, the triple cemented lens, the first double cemented lens, and the second double cemented lens of the third lens group may be composed of lenses having high and low Abbe numbers, so as to further reduce image aberration and chromatic aberration of optical imaging. Therefore, the fixed-focus lens has the advantages of a large FOV, small image aberration and chromatic aberration of imaging, a low distortion degree, and so on. Further, the fixed-focus lens may also effectively reduce ghost images of imaging. Furthermore, a bent angle of the optical axis of the fixed-focus lens at the reflector may be smaller, so as to further reduce the thickness of the RPTV.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed-focus lens, comprising:
   a first lens group, located between an object side and an image side, having a negative refractive power, and comprising at least one aspheric lens;
   a second lens group, disposed between the first lens group and the image side, having a positive refractive power, and comprising a lens; and
   a third lens group, disposed between the second lens group and the image side, having a positive refractive power, and comprising a triple cemented lens,
   wherein an effective focal length of the fixed-focus lens is f, an effective focal length of the first lens group is $f_1$, an effective focal length of the second lens group is $f_2$, an effective focal length of the third lens group is $f_3$, an axial distance between the first lens group and the second lens group is d, and the fixed-focus lens satisfies: $2.5<<|f_1/f|<4.5$, $7.5<f_2/f<10$, $4.5<f_3/f<8.5$, and $13<d/f<14$.

2. The fixed-focus lens as claimed in claim 1, wherein the first lens group comprises a first lens and a second lens arranged from the object side to the image side in sequence, the first lens and the second lens are both aspheric lenses, an effective focal length of the first lens is $f_{L1}$, an effective focal length of the second lens is $f_{L2}$, and the fixed-focus lens satisfies: $0.8<f_{L1}/f_1<2.5$ and $-35<f_{L2}/f_1<-28$.

3. The fixed-focus lens as claimed in claim 2, wherein the first lens group consists of the first lens, the second lens, a third lens, a fourth lens, and a fifth lens arranged from the object side to the image side in sequence, and refractive powers of the first, second, third, fourth, and fifth lenses are negative, positive, negative, negative, and positive, respectively.

4. The fixed-focus lens as claimed in claim 3, wherein third lens is a biconcave lens, the fourth lens is a convex-concave lens having a convex surface facing the image side, and the fifth lens is a biconvex lens.

5. The fixed-focus lens as claimed in claim 3, wherein the third lens is a convex-concave lens having a convex surface facing the object side, the fourth lens is a biconcave lens, and the fifth lens is a biconvex lens.

6. The fixed-focus lens as claimed in claim 1, wherein the axial distance d between the first lens group and the second lens group has multiple setting values.

7. The fixed-focus lens as claimed in claim 1, wherein the second lens group consists of a sixth lens having a positive refractive power.

8. The fixed-focus lens as claimed in claim 7, wherein the sixth lens is a concave-convex lens having a convex surface facing the object side.

9. The fixed-focus lens as claimed in claim 1, wherein the triple cemented lens has a negative refractive power, and consists of a seventh lens, an eighth lens, and a ninth lens, and refractive powers of the seventh lens, the eighth lens, and the ninth lens are negative, positive, and negative, respectively.

10. The fixed-focus lens as claimed in claim 9, a maximum of refractive indexes of the seventh lens, the eighth lens, and the ninth lens is $n_{max}$, a minimum of the refractive indexes thereof is $n_{min}$, a maximum of Abbe numbers of the seventh lens, the eighth lens, and the ninth lens is $v_{max}$, a minimum of the Abbe numbers thereof is $V_{min}$, and the fixed-focus lens satisfies: $n_{max}-n_{min}>0.25$ and $v_{max}-v_{min}>35$.

11. The fixed-focus lens as claimed in claim 9, wherein the third lens group further comprises:
    a first double cemented lens, disposed between the triple cemented lens and the image side, having a positive refractive power, and consisting of a tenth lens and an eleventh lens, wherein the tenth lens has a positive refractive power, and the eleventh lens has a negative refractive power; and
    a second double cemented lens, disposed between the first double cemented lens and the image side, having a negative refractive power, and consisting of a twelfth lens and a thirteenth lens, wherein the twelfth lens has a negative refractive power, and the thirteenth lens has a positive refractive power.

12. The fixed-focus lens as claimed in claim 11, wherein a refractive index and an Abbe number of the tenth lens are respectively $n_{L10}$ and $v_{L10}$, a refractive index and an Abbe number of the eleventh lens are respectively $n_{L11}$ and $v_{L11}$, a refractive index and an Abbe number of the twelfth lens are respectively $n_{L12}$ and $v_{L12}$, a refractive index and an Abbe number of the thirteenth lens are respectively $n_{L13}$ and $v_{L13}$, and the fixed-focus lens satisfies: $|n_{L10}-n_{L11}|>0.25$, $|v_{L10}-v_{L11}|>35$, $|n_{L12}-n_{L13}|>0.25$, and $|v_{L12}-v_{L13}|>35$.

13. The fixed-focus lens as claimed in claim 11, wherein the third lens group consists of a fourteenth lens, the seventh lens, the eighth lens, the ninth lens, the tenth lens, the eleventh lens, the twelfth lens, the thirteenth lens, and a fifteenth lens arranged from the object side to the image side in sequence, and the fifteenth lens has a positive refractive power.

14. The fixed-focus lens as claimed in claim 13, wherein the fourteenth lens has a positive refractive power.

15. The fixed-focus lens as claimed in claim 14, wherein the seventh, eighth, ninth, tenth, eleventh, twelfth, thirteenth, fourteenth, and fifteenth lenses are a convex-concave lens having a convex surface facing the object side, a biconvex lens, a biconcave lens, a biconvex lens, a convex-concave lens having a convex surface facing the image side, a biconcave lens, a biconvex lens, a concave-convex lens having a convex surface facing the image side, and a biconvex lens in sequence.

16. The fixed-focus lens as claimed in claim 13, wherein the fourteenth lens has a negative refractive power, and the fourteenth lens is an aspheric lens.

17. The fixed-focus lens as claimed in claim 16, wherein the seventh, eighth, ninth, tenth, eleventh, twelfth, thirteenth, fourteenth, and fifteenth lenses are a convex-concave lens having a convex surface facing the object side, a biconvex lens, a biconcave lens, a biconvex lens, a convex-concave lens having a convex surface facing the image side, a convex-concave lens having a convex surface facing the object side, a biconvex lens, a convex-concave lens having a convex surface facing the object side, and a biconvex lens, respectively.

18. The fixed-focus lens as claimed in claim 1, further comprising an aperture stop disposed between the second lens group and the third lens group.

19. The fixed-focus lens as claimed in claim 1, further comprising a reflector disposed between the first lens group and the second lens group for reflecting light beams from the second lens group to the first lens group.

* * * * *